April 25, 1961     B. K. GRIFFITHS     2,981,671
METHOD OF REDUCING SCALE FORMATION IN ELECTRODIALYTIC CELLS
Filed Dec. 15, 1958     2 Sheets-Sheet 1

Inventor
BENJAMIN KENNETH GRIFFITHS
By
Bailey, Stephens & Huettig
Attorneys

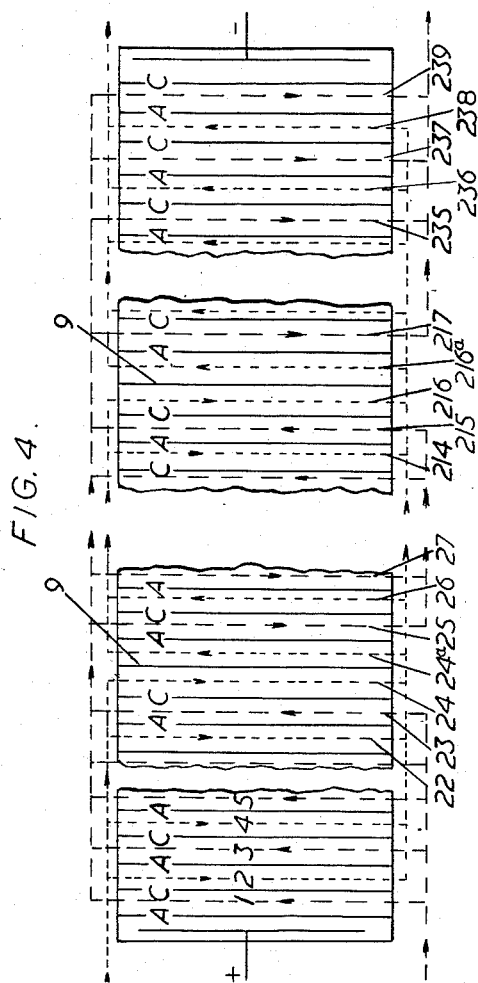

United States Patent Office 2,981,671
Patented Apr. 25, 1961

2,981,671

METHOD OF REDUCING SCALE FORMATION IN ELECTRODIALYTIC CELLS

Benjamin Kenneth Griffiths, London, England, assignor to The Permutit Company Limited Filed Dec. 15, 1958, Ser. No. 780,532

Claims priority, application Great Britain Dec. 19, 1957

6 Claims. (Cl. 204—180)

Multi-compartment electrodialysis cells comprise an electrode compartment at each end and intermediate compartments bounded by membranes which in modern practice are all ion-selective. Such cells containing alternating cation-selective and anion-selective membranes can be used to remove dissolved salts from aqueous solution if the solution in question is passed through every alternate compartment and another solution is passed through the remaining compartments. The compartments through which the solution under treatment passes will be called the desalting compartments. The second solution will be called the rinsing solution, and the compartments through which it flows the rinsing compartments. The rinsing solution receives ions from the solution under treatment by migration of cations into it from one adjacent desalting compartment and of anions into it from the other adjacent desalting compartment.

It is sometimes found that scale forms on one face of some of the membranes during the operation of such a desalting process. The scale does not form in the compartments through which the solution under treatment passes but on the far face of a membrane, generally the anion-selective membrane, bounding one or more of those compartments. Scaling is particularly prone to occur when the rinsing solution contains calcium and magnesium ions. These ions may be present in the rinsing solution from the start, or they may enter it from the solution under treatment in the course of the process.

The scale is composed of one or more compounds precipitated from solution and it appears not in a desalting compartment but in an adjacent compartment.

It is an object of this invention to provide means by which this objectionable formation of scale is reduced or eliminated.

I have found that the cause of the scaling is the formation of a layer depleted in electrolyte at the face of a membrane in the desalting compartment in question.

When the process being carried out in the cell is the desalting of water containing calcium or magnesium ions or both, a second stream of the same water being passed through the rinsing compartments, I believe the mechanism of scale formation to be as follows.

When the water being desalted becomes depleted in the ions of the salt in the neighborhood of the membranes, the only ions available to carry the current through the cation- and anion-selective membranes, respectively, are the $H^+$ and $OH^-$ ions of the water. The $OH^-$ ions passing through the anion membrane from the desalting compartment meet the magnesium and calcium ions in the water in the adjacent rinsing compartment. Since magnesium hydroxide is insoluble in water it precipitates and in so doing forms the scale on the membrane. Commonly the calcium hydroxide also formed is converted into calcium carbonate, which is likewise precipitated. In short, scaling is the result of the passage of $OH^-$ ions through the membrane, and there is little or no tendency for these ions to pass through it so long as there is an adequate supply of other anions at the interface between the membrane and the solution under treatment.

If the process being carried out in the cell is, for example, the removal of sodium benzoate from solution, benzoic acid will form in the next rinsing compartment and precipitate as scale on the cation-selective membrane if hydrogen ions carry the current from the desalting compartment through that membrane to react with the anions of the acid that have entered the rinsing compartment from the other side.

I have also found that the presence of the depleted layer in the desalting compartment is caused by either local or bulk depletion of the dissolved salts in the desalting compartments.

Bulk depletion results from poor distribution between desalting compartments to which the solution under treatment is fed in parallel flows, so that the compartment which is poorly fed with solution becomes desalted to a lower level than the compartments that are better fed. In the extreme case complete desalting will occur in the poorly fed compartment, but not in other compartments.

Local depletion occurs where there is a lack of mixing within any single compartment. A selective membrane by its nature allows more ions to be transported through it under the influence of the electric current than through the solution under treatment in a given time. The result is that in a given time more ions move across the interface between the membrane and the solution than across any cross-section in the solution. In other words at any instant the electrolyte immediately adjacent to the membrane is being depleted in ions. If the concentration of electrolyte in the bulk of the solution under treatment in the compartment in question is high enough, then enough ions will at once move into the solution in contact with the membrane to restore the concentration. At lower concentrations in the bulk of the electrolye, movement by diffusion is insufficient, but an adequate supply of ions at the face can still be ensured by providing adequate mixing within the compartment. At lower concentrations still it is quite impossible in practice to achieve sufficient mixing, e.g., through turbulence, to supply enough ions at the face, and then a layer of solution depleted in electrolyte is formed immediately adjacent to the membrane thus providing conditions favourable to the formation of scale on the far side of the membrane.

In the desalting of water the usual requirement is that the content of total dissolved solids shall be reduced to about 500 p.p.m. There are inevitably mechanical inequalities between the compartments in a cell, and, although the effluent water from a number of parallel compartments should theoretically all be of the same composition, in practice some is of higher and some of lower content of total dissolved solids. So far as the final product is concerned this is immaterial, provided that the average or bulk concentration is satisfactory. Moreover, if the bulk concentration is, as usual, an average between lower and higher concentrations, it is clear that the concentration in some compartments must be less than 500 p.p.m.

In practice in the desalting of water, the concentration at which some scaling often occurs corresponds to a bulk concentration of about 1,000 p.p.m. Clearly, therefore, in working down to a bulk concentration of 500 p.p.m. there is a considerable likelihood of scaling occurring in some compartments.

Broadly, scale may tend to form in any process in which cells containing alternate cation-selective and anion-selective membranes are used for the removal of ions from an aqueous solution through both the bounding membranes of the desalting compartments, and the solution in a rinsing compartment contains ions such that on the addtion of an acid or a base to the solution a compound that is insoluble or only sparingly soluble in water is formed.

It is not possible to predict in which compartments scaling will occur. A typical multi-compartment cell may contain 240 compartments, through half of which the solution under treatment flows. If the solution flows through these 120 compartments in parallel, it is difficult to obtain uniformity of flow, and scaling may occur in any compartment. For increased uniformity it is advantageous to cause the solution under treatment to flow through groups of compartments in series, the solution flowing in parallel streams through the compartments of each group. The solution is then progressively depleted in ions on emerging from the compartments of each group. In cells of this kind scale will often form on random membranes within the last two or three groups, though it may be that scale will form in many compartments of the last group.

Scaling is obviously most undesirable as it increases the electrical resistance of the cell and hence the power required for desalting. The compartments in a typical multi-compartment cell are very narrow, e.g. 1 mm. wide, and scaling also increases the resistance to flow of the solution and ultimately completely blocks the compartments. In fact, the formation of scale is today probably the greatest difficulty yet to be overcome in the exploitation of the electrodialytic desalting of water on an industrial scale.

Based on the discoveries set forth above, my invention comprises using less-selective membranes in place of some or all of the selective membranes on which the scale forms. I find that in this way I can largely or even wholly prevent scaling. The less-selective membranes may be completely non-selective, but, of course, only one kind of selective membrane bounding any desalting compartment must be replaced by a non-selective membrane at a time; if both were replaced, no desalting would occur. However, if the nature and conditions of operation of the process are such that scaling tends to take place on membranes of both kinds, it is possible to replace membranes of one kind at some points and membranes of the other kind at other points.

The selective membranes in the cell may be any known to have good selectivity.

The selective membranes used in practice are not perfectly selective, but in general they have a transport number for chloride ion, measured in sodium chloride solution, of more than about 0.9 if they are anion-selective, and less than 0.1 if they are cation-selective. Less selective membranes that may be used to replace such membranes may have transport numbers of less than 0.8 or more than 0.2 respectively. The transport number is, of course, dependent upon the concentration of the sodium chloride solution, and the figures given are those measured with the membrane separating solutions of sodium chloride of the same normality as the rinsing and desalting solutions with which the membrane will be in contact when it is used. It may thus happen that a membrane which is effective in preventing scaling when used in one position in a cell may not be equally effective when used in a different position.

For example, a less-selective membrane may consist of a sheet of paper impregnated with a lightly cross-linked ion-exchange resin. Such a membrane can be prepared, for example, by dipping a sheet of kraft parchment paper of weight about 100 gms./m.$^2$ in to a solution containing either the constituents of, or a liquid intermediate of, a sodium phenol sulphonate-phenol-formaldehyde or a guanidine-melamine-formaldehyde resin. The impregnated paper is cured by heating it to about 135° C. The use of a comparatively small portion of phenol or melamine results in a lightly cross-linked product.

The non-selective membranes used may consist of sheets of regenerated cellulose, e.g. that known by the registered trademark "Cellophane."

The invention may be used to cure scaling that is found to occur when a cell is in operation. In such a case, to discover which membranes require to be replaced the cell may be run with selective membranes until it scales and then be dismantled, and the scaled membranes replaced by the less-selective or non-selective membranes. It is important in such a case to reassemble the cell with the membranes and other parts in the same relative positions as before, the only change being the replacement of the scaled membranes.

In view of the fact that in the desalting of water, the aim is to reduce the bulk concentration of dissolved solids to a figure, e.g. 500 p.p.m., which is less than that (1000 p.p.m.) at which experience shows that scaling is likely, it is also possible to design a cell in which the risk of scaling is low and yet the current efficiency is very little reduced. This can be done when the series-parallel arrangement of the flows mentioned above is used. Supposing that there are ten groups, each of twenty-four compartments, it will not normally be until the last two or three groups that there is any tendency to scaling and therefore any need to use non-selective or less-selective membranes. It is a simple matter to calculate at what point within the cell the electrolyte concentration has been reduced to about 1000 p.p.m. and the substitution of the membranes may then be made from this point to the outlet end. For instance if water containing 3000 p.p.m. dissolved salts is to flow through ten groups of compartments, the bulk concentration should fall to 1000 p.p.m. in the water emerging from the eighth group, and all the anion-selective membranes in the ninth and tenth groups may be replaced by non-selective membranes. Thus broadly, if water in the course of treatment in a cell must pass in series flow through a number of compartments each bounded on one side by a cation-selective membrane and on the other side by an anion-selective membrane and in these the salt concentration of the solution is reduced to less than 1000 p.p.m. the flow thereafter continues through at least one further compartment in which the membrane on which the scale tends to form is replaced by a non-selective or less selective membrane.

By way of example, the use of the invention in the demineralisation of water will now be described in detail with reference to the accompanying drawings, in which:

Figure 4 is a diagram showing the routes followed through the cell by the water under treatment and the rinsing solution.

Figure 1:
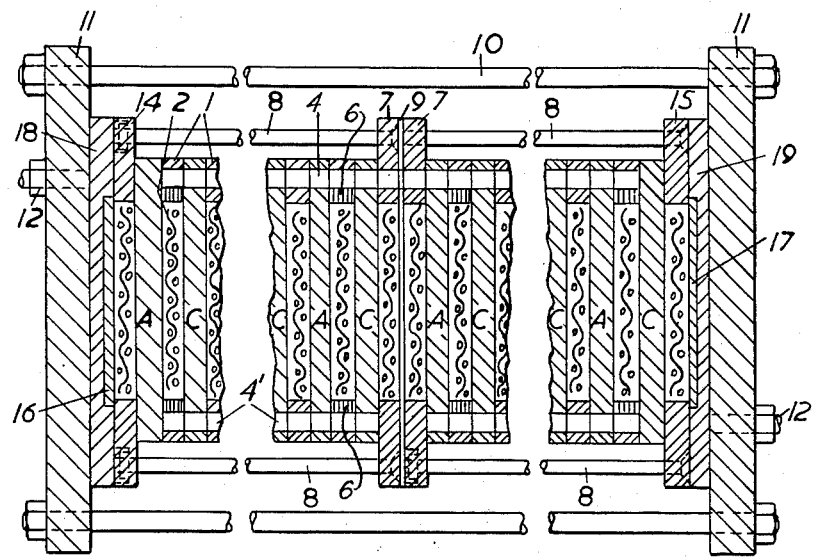
Figure 1 is a section through the electrodialysis cell used.

Referring first to Figure 1, an electrodialysis cell was constructed comprising 120 anion-selective membranes A alternating with 120 cation-selective membranes C, adjacent membranes being kept apart by gaskets 1 each 0.05" thick and made of plasticised polyvinyl chloride. The membranes were of the heterogeneous type, the anion-selective membranes being those known as Permaplex A–20 and comprising quaternary ammonium groups as the ion-exchange groups and the cation-selective membranes being those known as Permaplex C–20 and comprising sulphonic groups as the ion-exchange groups. The transport number of the anion-selective membranes for chloride ion was 0.9 and that of the cation-selective membranes was 0.07. The gaskets were in the form of square frames, with open centres 20 inches square forming the desalting and rinsing compartments. Each frame was filled as the cell was assembled with a sheet of coarse woven plastic gauze 2 to separate adjacent membranes. As shown more clearly in Figures 2 and 3, the edges of the gaskets and of the membranes were punched with rectangular holes 4, 4' and 5, 5' which registered with one another so as to form a series of channel-ways within the assembled cell. Access for liquid into and out of a compartment was given by extending a pair of holes on opposite sides of the compartment so that they broke into the open centre of the frame and formed passages joining the inside of the compartment to the adjacent channel-ways. In each of these passages was inserted a member 6 serving substantially to prevent deformation of the membranes into the passage while not substantially interrupting the flow of liquid through the passage.

The membranes were divided into groups of 24 bounded at each end by a gasket 7 larger than the intermediate gasket 1 so that its edges projected beyond those of the intermediate membranes and gaskets and served to accommodate bolts 8 by which the group of membranes and gaskets were held pressed tightly together. To make up the cell ten such groups were assembled end-to-end and held together by bolts 10 extending between endplates 11, the groups being kept in alignment by bolts 12 passing through holes 13 in the corners of each gasket. Adjacent groups were separated by electrically conducting liquid-impermeable separating sheets 9 provided with holes such that only one of each pair of channel-ways on opposite sides of the membranes passed through any one such sheet. The two end gaskets 14 and 15 were in contact respectively with a carbon anode 16 and cathode 17 and defined the electrode compartments, which were arranged to be fed with liquid separately from the other compartments by pipes (not shown) passing through pressure plates 18 and 19.

Figure 2:
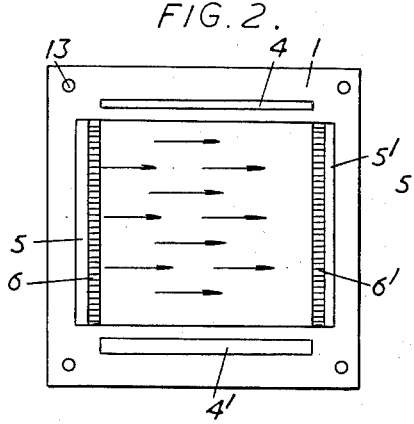
Figures 2 and 3 are face views of rinsing and desalting compartments respectively.
Figure 3:
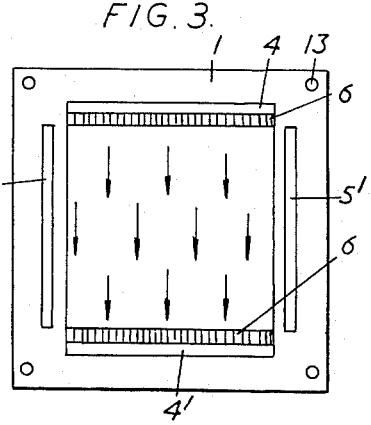

Alternate gaskets within each group were arranged as shown in Figures 2 and 3, the directions of liquid flow in adjacent compartments being at right-angles as indicated by the arrows. The desalting and rinsing streams flowed concurrently through the cell from the anode to the cathode end, each stream passing in series through the 10 groups and being divided within each group to flow in parallel through alternate compartments. The flow arrangement is shown in Figure 4, in which the compartments are numbered consecutively from the anode to the cathode end of the cell and the membranes are indicated by A and C. The pairs of compartments numbered 24 and 24a and 216 and 216a are each at the junction of two groups, and are in effect single compartments electrically divided into two halves by electrically conducting liquid-impermeable separating sheets 9.

Although the cell is shown for convenience in Figs. 1 and 4 with the compartments side by side, it is used vertically with the anode at the bottom and the cathode at the top.

The rate of flow through the desalting compartments was 275 imperial gallons/hour and through the rinsing compartments 55 gallons/hour, and the water initially contained 2660 p.p.m. (parts per million) of total dissolved solids (TDS) made up as follows:

|  | P.p.m. |
|---|---|
| $Ca^{++}$ | 208 |
| $Mg^{++}$ | 82 |
| $Na^+$ | 656 |
| $HCO_3^-$ (as $CaCO_3$) | 200 |
| $CO_3^=$ (as $CaCO_3$) | 10 |
| $SO_4^=$ | 346 |
| $Cl^-$ | 1240 |
| $NO_3^-$ | 5 |
| $SiO_2$ | 12 |
| TDS (measured) | 2660 |

The conductivity of the water was 3910 micromhos/cm.

A potential of 200 volts D.C. was applied to the electrodes, the steady current initially being 12.2 amps. The water emerging from the cell after having passed through the rinsing compartments had a TDS of 15,500 p.p.m. while the TDS of the desalted water was initially 500 p.p.m. The cell was run continuously, the applied voltage and flow rates being kept constant. Over a period of 200 hours, the current fell steadily and at the end of the period was 10.1 amps. The TDS of the desalted water rose correspondingly over the period and at the end was 1040 p.p.m.

At this point the cell was shut down and dismantled. A number of the anion-selective membranes were found to be appreciably scaled, these being the 2nd, 4th, 8th, 12th, 16th, 24th, 30th and 34th membranes from the outlet end. The scale was found by analysis to consist of a mixture of magnesium hydroxide and calcium carbonate.

The cell was then re-assembled exactly as before except that the above membranes were replaced by non-selective membranes consisting of sheets of regenerated cellulose (cellophane). The cell was then run with the same applied voltage and the same rinsing flow rate as previously. The desalting flow rate was adjusted to give an initial effluent of 500 p.p.m.: this was found to require 269 imp. gallons/hour. The initial steady current taken was again 12.2 amps.

The cell was run continuously as before and after 400 hours both the current and the TDS of the desalted effluent were still, within the accuracy of measurement, the same as they were initially. The cell was dismantled, and all the membranes were then found to be wholly free from scale.

It will be observed that the only other effect of introducing the non-selective membranes into the cell was a very slight reduction of the amount of treated water obtainable in a given time for a given consumption of electric power.

I claim:

1. In a process for removing ions from aqueous solution by passage of the solution through every alternate compartment of a multi-compartment electrodialysis cell containing alternating cation-selective and anion-selective membranes, ions to be removed passing through both the membranes bounding each such compartment into another solution passing through the remaining compartments, and the process being such that scale forms on some but not all of the membranes, the improvement comprising substituting for at least some of the selective membranes on which scale forms only by membranes of sufficiently lower selectivity to produce a substantial decrease in scaling, not more than one membrane of any compartment being substituted by a non-selective membrane.

2. In a process for desalting water containing ions selected from the group of calcium or magnesium ions by passage of the water through every alternate compartment of a multi-compartment electrodialysis cell containing alternating cation-selective and anion-selective membranes while water containing dissolved salts passes through the remaining compartments, the conditions being such that scale forms on some but not all of the anion-selective membranes, the improvement which comprises replacing at least some of those membranes only by membranes of sufficiently lower selectivity to produce a substantial decrease in scaling, not more than one membrane of any compartment being substituted by a non-selective membrane.

3. A process for removing ions from aqueous solution having a salt concentration greater than 1000 p.p.m. comprising passing the solution through a plurality of compartments of an electrodialytic cell in series, each compartment being bounded on one side by a cation-selective membrane and on the other side by an anion-selective membrane, the compartments alternating in the cell with others through which a second solution is passed and the conditions being such that scale forms on at least one of the kinds of membrane when the salt concentration is low, and when the salt concentration of the solution is less than 1000 p.p.m. continuing the flow through at least one further compartment in which the membrane on which the scale forms is replaced by a membrane of sufficiently lower selectivity to produce a substantial decrease in scaling, not more than one membrane of any compartment being substituted by a non-selective membrane.

4. A process according to claim 3 applied to the desalting of water in which it is the anion-selective membrane that is replaced in the further compartment or compartments.

5. A process according to claim 3 in which the compartment are arranged in groups themselves arranged in series, and the solution flows in parallel through the compartments of each group.

6. In a process as claimed in claim 1, the less-selective membranes being non-selective.

References Cited in the file of this patent

UNITED STATES PATENTS

| | | |
|---|---|---|
| 2,694,680 | Katz et al. | Nov. 16, 1954 |
| 2,796,395 | Roberts | June 18, 1957 |
| 2,829,095 | Oda et al. | Apr. 1, 1958 |
| 2,872,407 | Kollsman | Feb. 3, 1959 |

OTHER REFERENCES

Cooke: "Scaling Problems in Electrodialysis Using Permselective Membranes," "Chemistry and Industry," May 10, 1958, pp. 555 and 556.